US012789359B2

(12) United States Patent
Garcia Armada et al.

(10) Patent No.: US 12,789,359 B2
(45) Date of Patent: Nov. 10, 2026

(54) SUPPORT DEVICE FOR AN EXOSKELETON SYSTEM, EXOSKELETON SYSTEM COMPRISING SAID SUPPORT DEVICE AND METHOD TO OPERATE THE EXOSKELETON SYSTEM

(71) Applicant: MARSI BIONICS, S.L., Madrid (ES)

(72) Inventors: Elena Garcia Armada, Madrid (ES); Iñaki Aguirre Pichel, Madrid (ES); Alberto Plaza Flores, Madrid (ES); Carlos Sanz Salcedo, Madrid (ES)

(73) Assignee: MARSI BIONICS, S.L., Madrid (ES)

( * ) Notice: Subject to any disclaimer, the term of this patent is extended or adjusted under 35 U.S.C. 154(b) by 0 days.

(21) Appl. No.: 19/283,800

(22) Filed: Jul. 29, 2025

(65) Prior Publication Data

US 2026/0091483 A1 Apr. 2, 2026

(30) Foreign Application Priority Data

Sep. 30, 2024 (EP) .................................... 24383050

(51) Int. Cl.
*B25J 9/00* (2006.01)
*A61G 5/14* (2006.01)
(Continued)

(52) U.S. Cl.
CPC .............. *B25J 9/0006* (2013.01); *A61H 3/00* (2013.01); *A61G 5/14* (2013.01); *A63B 21/00181* (2013.01)

(58) Field of Classification Search
CPC ............. B25J 9/0006; A61H 3/00; A61G 5/14
(Continued)

(56) References Cited

U.S. PATENT DOCUMENTS 8,790,284 B2 * 7/2014 Jeon ..................... A61H 1/0292 297/DIG. 10
10,245,204 B2 * 4/2019 Sandler ................ A61H 1/0274
(Continued)

FOREIGN PATENT DOCUMENTS

CN 111228089 A 6/2020
CN 116 059 086 A 5/2023
(Continued)

OTHER PUBLICATIONS

Trans. KR-100716597-B1 (Year: 2026).*
(Continued)

*Primary Examiner* — J. T. Newton
(74) *Attorney, Agent, or Firm* — LUCAS & MERCANTI, LLP

(57) ABSTRACT

A support device (2) for an exoskeleton system (1) including a wheeled frame (21), a displaceable connector (22) for connection to a lumbar portion (31) of the exoskeleton (3), and a powered mechanism for moving the displaceable connector (22) between an upper position and a lower position. The support device (2) further includes a foldable seat (23) connected to the wheeled frame (21) and a synchronization assembly (24) configured for folding/unfolding the seat (23). The support device (2) is advantageous in that the seat (23) is configured for moving up and down together with the displaceable connector (22) and the synchronization assembly (24) is configured for selecting a desired height of folding/unfolding of the seat (23). An exoskeleton system (1) having a support device (2) and an exoskeleton (3), and a method for operating the exoskeleton system (1).

15 Claims, 8 Drawing Sheets

(51) Int. Cl.
*A61H 3/00* (2006.01)
*A63B 21/00* (2006.01)

(58) Field of Classification Search
USPC .................................... 128/845; 297/DIG. 10
See application file for complete search history.

(56) References Cited

U.S. PATENT DOCUMENTS

| | | | | |
|---|---|---|---|---|
| 2017/0071812 | A1* | 3/2017 | Sandler | A61H 1/0274 |
| 2019/0247695 | A1* | 8/2019 | Park | A61G 5/1056 |
| 2019/0247697 | A1* | 8/2019 | Park | A63B 21/4011 |
| 2019/0282431 | A1* | 9/2019 | Moore | A61G 5/04 |
| 2021/0401644 | A1* | 12/2021 | Villarreal Suarez | A61G 5/041 |

FOREIGN PATENT DOCUMENTS

| | | | | |
|---|---|---|---|---|
| CN | 116 158 948 | A | 5/2023 | |
| EP | 2361734 | B1 | 3/2017 | |
| EP | 3225363 | B1 | 7/2019 | |
| EP | 3539522 | A1 * | 9/2019 | A61H 3/04 |
| KR | 100716597 | B1 * | 5/2007 | A61H 3/04 |
| KR | 101433284 | B1 | 9/2014 | |

OTHER PUBLICATIONS

European Search Report, dated Mar. 5, 2025, which was issued for the corresponding European Patent Application No. EP 24 38 3050, 2 pages.

* cited by examiner

SUPPORT DEVICE FOR AN EXOSKELETON SYSTEM, EXOSKELETON SYSTEM COMPRISING SAID SUPPORT DEVICE AND METHOD TO OPERATE THE EXOSKELETON SYSTEM

CROSS REFERENCE TO RELATED APPLICATION

This application claims the benefits of priority of European Patent Application No. EP24383050.2, filed on Sep. 30, 2024, the content of which is incorporated herein by reference.

TECHNICAL FIELD

The present invention belongs to the field of exoskeleton used as a walking aid for disabled users, and in particular for disabled children.

A first object of the present invention is a support device for an exoskeleton system, the support device having an improved configuration with respect to the prior art.

A second object of the present invention is an exoskeleton system comprising said support device and an exoskeleton.

A third object of the present invention is a method for operating an exoskeleton system of the type disclosed above.

STATE OF THE ART

Rehabilitation and muscle training therapies have turned out to be very beneficial in lower limb mobility recovery in patients that suffer from neurological, traumatic, or neuromuscular diseases, such as complete and incomplete Spinal Cord Injury (SCI), stroke, multiple sclerosis, cerebral palsy, and other neurological diseases. As part of those therapies, a series of active mobility assistance devices have been developed with the purpose of reducing the physiotherapists' repetitive workload. In particular, exoskeletons proved to be especially effective for allowing several joints to move simultaneously and for training/aiding the patient in the gait recovery process.

Lower limb exoskeletons (in the following, referred to only as "exoskeletons") are robotic devices used for the rehabilitation of patients affected by pathologies that influence the mobility of the lower limbs. An exoskeleton is designed to provide support at least to the hips and knees of both limbs by means of corresponding powered mechanical joints. The exoskeleton is worn by the patient and, by means of the powered mechanical joints suitably controlled by means of a controller receiving information from a set of sensors, aid the patient in moving the biological joints corresponding to the relevant mechanical joints. More particularly, a conventional exoskeleton comprises a lumbar portion mechanically connected to a pair of mechanical hip joints which, in turn, are optionally connected to a pair of mechanical knee joints and on occasions also mechanical ankle joints. Document EP3225363B1, developed by some of the inventors of the present application, discloses an exemplary exoskeleton.

Also known are exoskeleton systems comprising an exoskeleton and a wheeled support to aid the patient while donning or doffing the exoskeleton. The support is essentially a rigid structure supported on wheels and having a powered mechanism configured to cause a displaceable component to selectively move up and down between an upper position and a lower position. The displaceable component comprises connection means with the rear side of the lumbar portion of the exoskeleton. Thus, when the lumbar portion of the exoskeleton is connected to the displaceable component of a support of this type, moving the displaceable component from the lower position towards the upper position aids the user of the exoskeleton in the process of standing up. The wheels then allow for the support to move with the user as he/she walks around with the exoskeleton if necessary. Otherwise, the lumbar portion can be disconnected from the displaceable component of the support for the user to walk by himself. In any case, once the lumbar portion of the exoskeleton is again connected to the displaceable component, moving the displaceable component from the upper position towards the lower position aids the user using the exoskeleton in the process of sitting down.

Document CN111228089A discloses an exemplary device comprising a support device and an exoskeleton. In this device, the rear side of the lumbar support is connected to a pair of rail clamps running along a pair of vertical rails.

When using this type of exoskeleton system, a person assisting the user needs to place a chair, stool or the like under the user midway through the process of sitting down. Indeed, when the user is standing up, and therefore the displaceable component of the support is in the upper position, there is no space between the structure of the support and the exoskeleton for any sitting device. The displaceable component then starts to descend and, consequently, as the knee joints of the exoskeleton (and also the knees of the user) bend, a space appears under the lumbar portion of the exoskeleton (and thus under the torso of the user). It is only then that the person assisting the user of the exoskeleton can insert a sitting device for the user to sit once the displaceable component arrives at the lower position, whereby the user ends up seated onto the sitting device.

To solve this problem, some known exoskeleton systems comprise a support having a foldable stool, chair or the like. This chair or stool must be folded while the user is in the standing position, and it is unfolded at a certain point during the process of sitting down. The assistant then only needs to fold/unfold the sitting device at the suitable moment during the sitting or standing process. Document KR101433284B1 discloses an exoskeleton system comprising a support having a foldable sitting device.

Further, exoskeleton systems are also known where the support device not only comprises a foldable sitting device, but also the folding/unfolding of the sitting device is synchronized with the mechanism for raising and lowering the displaceable component. Thus, when the displaceable component is moving upwards, the sitting device is automatically folded upon the displaceable component reaching a certain intermediate position between the lower and upper positions. Conversely, when the displaceable component is moving downwards, the sitting device is automatically unfolded upon the displaceable component reaching said intermediate position. The assistant is thus dispensed with the task of folding/unfolding the sitting device manually. Document EP2361734B1 discloses an exoskeleton system comprising a support having a synchronized foldable sitting device.

In this context, a problem remains unsolved in that not all users need the sitting device to be positioned at the same height. This is particularly important in the case of disabled children, whose height can be very variable, specially when using evolutive exoskeletons, that is, exoskeletons having means for increasing their size as the children grow.

DESCRIPTION OF THE INVENTION

The present invention solves the aforementioned drawbacks by means of a support device and an exoskeleton system comprising said support device and an exoskeleton.

Advantageously, the support device is configured for selecting a desired height at which the seat will fold/unfold during the process of standing up or sitting. The height of the seat can thereby be easily changed as the user of the exoskeleton grows, or else to adapt the support device to a user having a different height, even if using a different exoskeleton, i.e. a smaller or larger exoskeleton. The support device is also useful for allowing the user to sit at different heights, e.g. depending on the height of a table the user is sitting at.

In the present document, terms such as "down", "up", "below", "above", "downwards", "upwards", "front", "forward", "rear", "back" as well as similar relative terms must be interpreted in connection with the natural orientation of the exoskeleton while in use, i.e. while worn by a patient that is standing on his/her feet.

First Aspect: Support Device

A first aspect of the invention is directed to a support device for an exoskeleton system. The support device essentially comprises a wheeled frame, a displaceable connector, and a powered mechanism. These features are now disclosed in greater detail:

Wheeled Frame a. The wheeled frame is a rigid frame usually made of metallic or plastic bars supported on wheels. The function of the wheeled frame is to provide a firm support at least when the user dons or doffs the exoskeleton and when the user wearing the exoskeleton stands up or sits down. The wheeled frame is provided with wheels, such that it can move around when pushed by an assistant to the person using the exoskeleton. If needed, the wheeled frame can thereby also provide support while the person is walking with the exoskeleton. In any case, the support device is configured such that the wheels are at all times in contact with the ground, i.e. rolling thereon as the user moves around.

Displaceable Connector a. The displaceable connector is configured for connection to a lumbar portion of the exoskeleton. By the displaceable connector moving up or down, the user can be helped when standing up or sitting down.
b. Note that the connection between the displaceable connector and the lumbar portion of the exoskeleton is disconnectable, i.e. the exoskeleton can be disconnected from the support device. Disconnecting the exoskeleton from the support device is useful e.g. for storing the exoskeleton or for allowing the user to walk around by himself/herself.

Powered Mechanism a. The powered mechanism is connected to the wheeled frame and the displaceable connector for causing said displaceable connector to move up and down with respect to the wheeled frame between an upper position and a lower position.

Additionally, the support device of the invention further comprises a foldable seat connected to the wheeled frame, as well as a synchronization assembly configured for folding/unfolding said seat in synchronization with the movement of said displaceable connector.

The support device of the invention thus aids the user during the processes of standing up and sitting down. For example, for standing up, the lumbar portion of the exoskeleton in a sitting position is first attached to the displaceable connector in the lower position. The seat of the support device must be unfolded, i.e. in an essentially horizontal position. The user then sits on the seat and dons the exoskeleton. Next, the powered mechanism is actuated to cause the displaceable connector to move upwards from the lower position towards the upper position. The lumbar portion of the exoskeleton is thereby pulled up, such that neither the user nor an assistant has to push all the weight of the exoskeleton upwards. At a certain point during this process, the synchronization assembly causes the folding of the seat, thus providing the user with space for his/her legs in the standing position. An essentially inverse process takes place when aiding the user during the process of sitting down.

The features disclosed until this point are known from the prior art. However, in prior art support devices, known synchronization assemblies cause the seat to fold/unfold always at the same height. This configuration is only useful if the size of both the user and the exoskeleton match said height. However, if the user and the exoskeleton do not have the specific size matching the height at which the seat unfolds, then the user is uncomfortable and needs to adopt unnatural positions both when sitting down and when standing up.

The support device of the invention is characterized in that the seat is configured for moving up and down together with the displaceable connector, and further in that the synchronization assembly is configured for selecting a desired height at which the synchronized process of folding/unfolding of the seat takes place.

The seat can therefore unfold at a higher position when the user is taller or at a lower position if the user is shorter. This is particularly useful for disabled children which brain damage, as these children frequently make use of exoskeleton for several years. Evolutive exoskeletons having a size that can be adapted to the size of this kind of users are known. Now, with the support device of the present invention, the height of the seat can be adapted as the user and the exoskeleton increase in size. As mentioned earlier in the present document, controlling the height of the seat is also useful in other situations, such as when sitting at a table and the like.

Both the powered mechanism causing the movement of the displaceable connector and the synchronization assembly can have a number of configurations provided they carry out the functions disclosed above.

However, in a particularly preferred embodiment, the powered mechanism comprises a sliding plate slidingly connected to at least an essentially vertical rod (preferably two) and a gearmotor configured to move the sliding plate up and down along said essentially vertical rod. The displaceable connector is attached to an upper portion of the sliding plate and the seat has an upper side rotatably connected to a lower portion of the sliding plate. Further, the synchronization assembly is configured to cause the rotation of the seat with respect to the sliding plate from an essentially vertical folded position to an essentially horizontal unfolded position upon said sliding plate reaching the desired height when moving downwards. Conversely, the synchronization assembly is configured to cause the rotation of the seat with respect to the sliding plate from the essentially horizontal unfolded position to the essentially vertical folded position upon the sliding plate reaching the desired height when moving upwards.

In a still more preferred embodiment of the invention, the powered mechanism further comprises a worm gear provided in parallel to said at least one vertical rod, and the sliding plate is threadedly engaged to said worm gear. Thus, when the gearmotor rotates the worm gear, the sliding plate is caused to slide vertically along the at least one vertical rod. In other words, the vertical rod acts as a guide for the sliding plate upward and downward movement.

Even more preferably, in the present invention the sliding plate is slidingly connected to the vertical rod by means of at least one first sliding component and at least one second sliding component respectively provided at an upper back side of the sliding plate and at a lower back side of the sliding plate. Each of these sliding components may comprise, e.g. a body having a vertical cylindrical hole through which the vertical rod passes.

In a further preferred embodiment of the invention, the synchronization assembly is configured for selecting the desired height manually. In this context, this means that no tools are needed to change the desired height further than the hands of a person, and also that the change in height is carried out in a fast and simple manner. The assistant can then look at the person who is going to use the exoskeleton, adapt the desired height by manipulating the synchronization assembly, and then start to assist the user in donning the exoskeleton.

In a still further preferred embodiment of the invention, the synchronization assembly comprises:

a. A vertical rail.

b. An arm having an upper end rotatably attached to a position of the seat separated from the upper side thereof and a lower end rotatably attached to a sliding member, where the sliding member is slidably attached to the vertical rail. Note that to increase stability more than one arm could be employed, e.g. two arms converging at the sliding member. The separation between the point of attachment of the upper end of the arm and the upper side of the seat is required for causing a rotation torque for folding/unfolding the seat, as disclosed in detail below.

c. A stop member configured to be rigidly attached to the vertical rail at a selected height along said rail. In this context, note that the selected height of the stop member, i.e. the height at which the stop member is rigidly attached to the vertical rail, is lower than the desired height of the seat, i.e. the height at which the seat folds/unfolds. Further, while the aforementioned rigid attachment can be carried out in several manners, in a particular embodiment of the invention the rail comprises a plurality of holes and the stop member comprises a pin configured to selectively engage a selected hole at the selected height.

With this configuration, as the displaceable connector moves downwards from the upper position, the sliding member at the lower end of the arm attached to the seat also slides downwards along the vertical rail. Thus, upon abutting against the stop member rigidly attached to said vertical rail, the arm exerts a torque, i.e. an upward force onto the seat that causes its upward rotation until arriving to the essentially horizontal unfolded position. Conversely, as the displaceable connector moves upwards from the lower position, eventually the sliding member slides upwards and ceases to abut against the stop member. The arm then ceases to exert an upward force onto the seat and allows gravity to cause the seat to rotate downwards until arriving to the essentially vertical folded position.

In still one further preferred embodiment, the support device further comprises a locking device configured for locking the rotatable attachment between the upper end of the arm and the seat when the seat is in the essentially horizontal unfolded position. Thus, when locked, the seat remains in said unfolded position even when the sliding member stops abutting against the stop member.

The locking device can be configured in a number of manners known to the skilled person. Merely as an example, a locking pin and a complementary socket can be provided at the relevant joint. Then, upon the assistant or the user inserting the pin in the socket, the pin would mechanically prevent the joint from rotating, thereby locking the seat in the horizontal position. Optionally, a spring may be also provided to bias the locking pin towards the locking position when inserted in the socket.

Use of this locking device enables the seat to be freely moved up or down in the unfolded position. This is useful in many circumstances, such as e.g. for arriving at a comfortable height when sitting at a table, or for causing the legs of the user to hang from the seat for using the support device as a wheelchair.

In this context, note that the support naturally also comprises a processing means for controlling the movement of the displaceable connector, i.e. for controlling the operation of the motor actuating the worm gear. Thereto, the processing means requires data indicating the position of the relevant components of the mechanism. Thus, in a still further preferred embodiment of the invention, the support device further comprises:

A first sensor detecting the position of the displaceable connector. This sensor could be of any type provided the position of the displaceable connector is known. For example, in a preferred embodiment, this sensor is an absolute encoder provided at the uppermost end of the worm gear. Thus, by knowing the exact position of the worm gear, the height of the displaceable connector is derived.

Means configured for connection with a plurality of sensors of the exoskeleton detecting the position of the hip and knee joints of said exoskeleton. These means for connection could be an electrical connector configured for connection with a data bus coming from the exoskeleton, an electrical connector for connection with a socket provided at a processing means controlling the operation of the exoskeleton, or the like.

Thus, the powered mechanism is automatically controlled depending on the position of the displaceable connector and of the hip and knee joints of the exoskeleton. In particular, the upper position of the displaceable connector, i.e. the position where the powered mechanism is commanded to stop at the end of a standing up operation, takes place when the hip and knee joints of the exoskeleton indicate that the user is effectively in a standing position. Similarly, the lower position of the displaceable connector, i.e. the position where the powered mechanism is commanded to stop at the end of a sitting operation, takes place when the hip and knee joints of the exoskeleton indicate that the user is effectively in a sitting position.

Note that the mechanism disclosed above may block upon the seat reaching the essentially horizontal unfolded position. Thus, if the displaceable connector continues to move downwards after reaching said unfolded position, the mechanism could break. To prevent this situation, in a still further preferred embodiment of the invention the support device further comprises a second sensor provided at the rotatable attachment between the upper end of the arm and the seat. This second sensor, preferably a switch or rotational sensor, is configured for detecting a position where the seat has arrived at the unfolded position, whereby the powered mechanism is automatically stopped when said unfolded position is detected. Breakage of the mechanism is thus prevented. This sensor can also be configured to detect the moment where the seat has reached the folded position, supervising its state during any movement of the device, such as walking.

In a still further preferred embodiment, the wheeled frame further comprises a handle provided at a side of said frame opposite the displaceable connector for an assistant to push. Also preferably, the support device of the invention further comprises four wheels attached to an underside of said wheeled frame.

Second Aspect: Exoskeleton System

A second aspect of the present invention is directed to an exoskeleton system comprising a support device and an exoskeleton. The exoskeleton comprises a lumbar portion having means for connection to a displaceable connector of the support device, said displaceable connector being configured to move up and down between an upper position and a lower position to aid the user when sitting and standing up.

Third Aspect: Method to Operate an Exoskeleton System

A third aspect of the present invention is a method for operating an exoskeleton system according to the above disclosure.

A single processing means could be used for controlling the operation of the whole exoskeleton system, i.e. for controlling the operation of both the support device and the exoskeleton, which naturally must operate in a synchronized manner. Alternatively, more than one processing devices connected ones with the others could be used. In any case, the exoskeleton system is operated such that the displaceable connector is caused to move up or down depending on whether the user is sitting or standing up, and folding/unfolding of the seat takes place automatically in a synchronized manner by means of the aforementioned mechanical synchronization assembly.

This method comprises essentially the following operations:

i. During a stand-up process, commanding the powered mechanism to move the displaceable connector upwards and, when arriving at the upper position where the hip and knee joints of the exoskeleton are detected to be extended, commanding the powered mechanism to stop.

As discussed earlier, the standing position is detected by the plurality of sensors of the exoskeleton, said information being transmitted to the processing means controlling the operation of the exoskeleton system as a whole by means of suitable electric connections. Upon receiving said information, the processing means commands the motor moving the worm gear to stop.

i. During a sitting process, commanding the powered mechanism to move the displaceable connector downwards and, when arriving at the lower where the hip and knee joints of the exoskeleton are detected to be bent, commanding the powered mechanism to stop.

Again, the sitting position is detected by the plurality of sensors of the exoskeleton, and still again said information is transmitted to the relevant processing means. Upon receiving said information, the processing means commands the motor moving the worm gear to stop.

In a preferred embodiment of the invention, the method further comprises the step of commanding the powered mechanism to stop when the second sensor detects that the seat has arrived at the folded position irrespective of the condition of the hip and knee joints of the exoskeleton. This feature prevents the displaceable connector from continuing to move downwards once the mechanical synchronization assembly is blocked upon the seat arriving at the unfolded position.

In yet another preferred embodiment of the invention, the method further comprises the following steps:

Actuating the locking device to lock the seat in the unfolded position. Upon taking the seat to the lower position, the user can therefore comfortably sit onto the seat, which now does not fold irrespective of the position of the displaceable connector.

Commanding the powered mechanism to move the sliding plate upwards until arriving to an intermediate position between the lower position and the upper position, thus causing the seat to also move upwards. That is, in this mode of operation, the seat does not alternate only between the lower position and the upper position, but it can be commanded to stop at an intermediate position that is high enough to cause the legs of the user to hang, i.e. no part of the exoskeleton touches the ground. The user is thus seated as in a wheelchair.

Moving the support device in the manner of a wheelchair. For example, an assistant can push the support device using the handle, and the user can thus be transported in a simple and convenient way.

DETAILED DESCRIPTION OF THE INVENTION

Figure 1A:
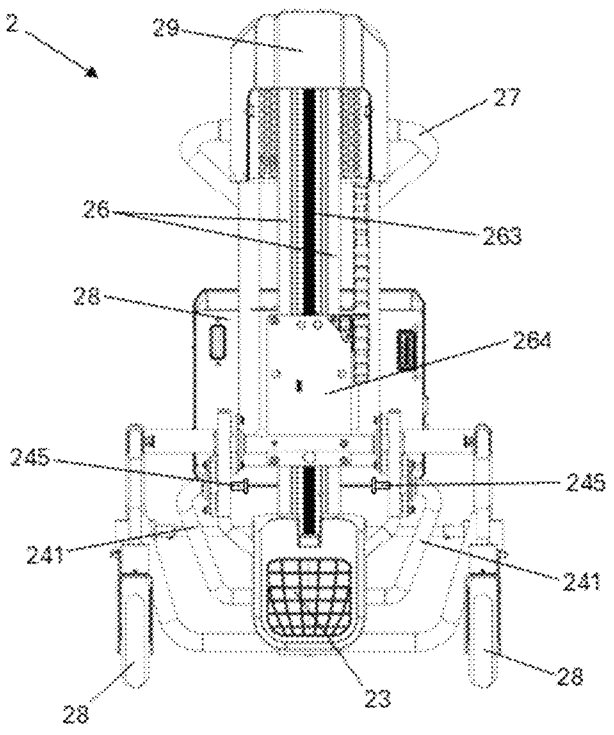
FIGS. 1*a* and 1*b* respectively show a front view and side view of the support device of the invention without a displaceable connector and with the seat folded.
Figure 1B:
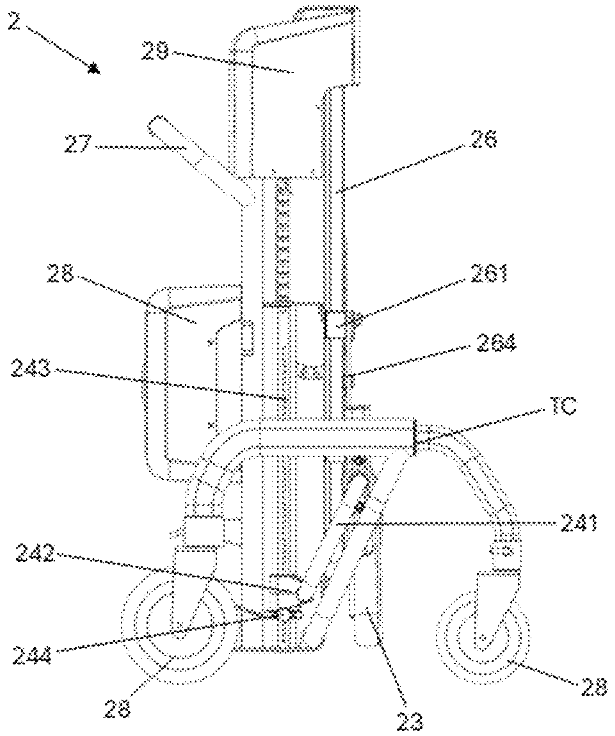
Figure 2A:
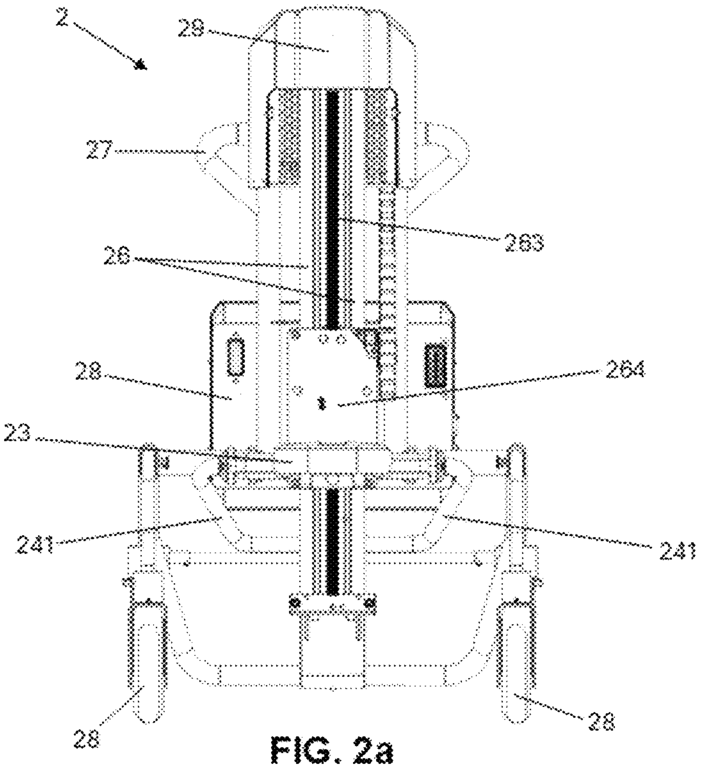
FIGS. 2*a* and 2*b* respectively show a front view and side view of the support device of the invention without a displaceable connector and with the seat unfolded.
Figure 2B:
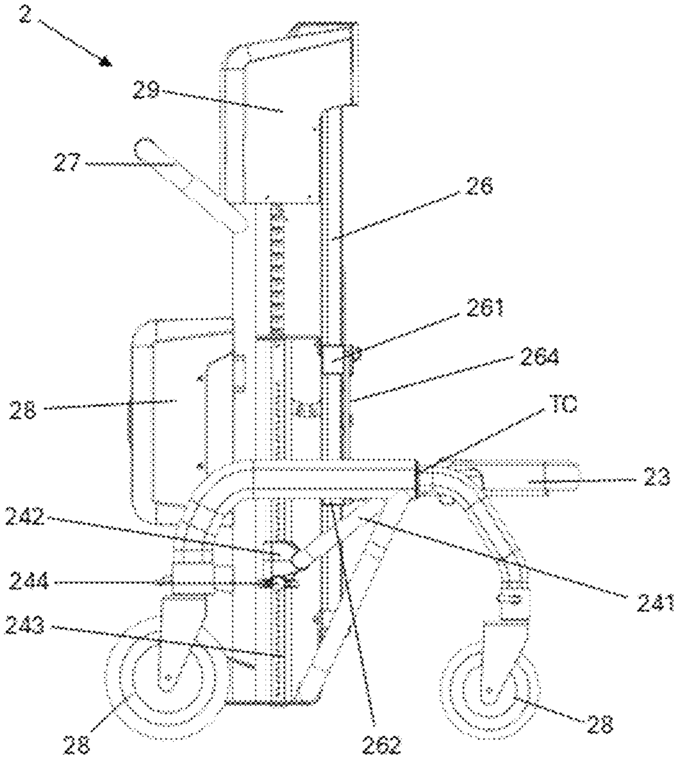

The exoskeleton system (1) comprises a support device (2) and an exoskeleton (3).

The exoskeleton (3) comprises a lumbar portion (31), a pair of hip joints (32) and a pair of knee joints (33). Note that this is merely an example, as the exoskeleton (3) could be a partial exoskeleton provided the lumbar portion (31) is present, i.e. an exoskeleton having less joints. For example, the exoskeleton may have a lumbar portion (31) with only two hip joints (32), or a lumbar portion (31) with only one hip joint (32) and one knee joint (33) of a single leg. In any case, the lumbar portion (31) of the exoskeleton (3) has means for connection to a displaceable connector (22) of the support device (2).

Both the displaceable connector (22) and the means for connection with this displaceable connector (22) provided at the rear side of the lumbar portion (31) can have any suitable configuration. In the present example, the displaceable connector (22) comprises a rigid rear wall having two forwardly oriented flanges between which a horizontal bar is provided (not visible in the figures). In turn, the rear side of the lumbar portion (31) of the exoskeleton (3) comprises a complementary structure configured for attachment onto said horizontal bar, e.g. for "hanging" onto that horizontal bar. When attached to the displaceable connector (22), the weight of the exoskeleton (3) is thus completely supported by said displaceable connector (22) instead of the user.

The support device (2) comprises a wheeled frame (21), the aforementioned displaceable connector (22) slidably attached to the wheeled frame (21), and a powered mechanism that causes the displaceable connector (22) to move up and down between an upper position and a lower position with respect to the wheeled frame (21). In this connection, note that terms such as "upper" and "lower" should be interpreted considering the support device (2) and the exoskeleton (3) are in their natural use positions.

The wheeled frame (21) is essentially made of interconnected metal bars. A lower structure of the wheeled frame (21) comprises four legs each having a corresponding wheel (28) for the wheeled frame (21) to move around when needed. The lower structure comprises a telescopic connection (TC) between the bars supporting the front wheels (28) and the bars supporting the rear wheels (28), such that the lower structure is extensible in a forward direction to separate the rear wheels (28) from the forward wheels (28). The forward dimensions of the wheeled frame (21) can therefore also be adapted to the size of the person using the support device (2) and the exoskeleton (3) to increase stability if needed.

A vertical structure emerges vertically from a rear portion of the lower structure. The vertical structure is essentially made of vertical metal bars. A handle (27) protrudes backwards from a rear upper portion of the vertical structure to enable an assistant to push the support device (2) for moving it around. In the present exemplary embodiment, a first casing (28) is attached to a rear middle portion of the vertical structure and a second casing (29) is attached to an upper portion of the vertical structure. These two casings (28, 29) comprise auxiliary equipment needed to operate the powered mechanism and the exoskeleton (3), such as batteries, gearmotor, processing means (in the form e.g. of electronic boards), etc. A synchronization assembly (24) is provided at the front middle and lower portion of the vertical structure. The synchronization assembly (24) is configured for synchronizing the folding/unfolding of a seat (23) that is also provided at the front portion of the vertical structure, as disclosed further down below in the present document.

The powered mechanism is provided between the wheeled frame (21) and the displaceable connector (22). As mentioned earlier, the powered mechanism is configured to move the displaceable connector (22) up and down between an upper position and a lower position. In the present embodiment, the powered mechanism comprises two vertical rods (26) each rigidly connected in a vertical position between the lower structure and an upper portion of the vertical structure of the wheeled support device (2). In the present exemplary embodiment, the rods (26) are strictly vertical. However, note that the rods (26) could have a certain inclination provided they have a vertical component substantially larger than the horizontal component. The powered mechanism also comprises a worm gear (263) provided between the two vertical rods (26). The worm gear (263) is parallel to the vertical rods (26). The worm gear (263) is attached to an electric gearmotor (provided inside the second casing (29) at the upper portion of the vertical structure, thus not visible in the figures), such that upon activation of the gearmotor the worm gear (263) rotates.

A sliding plate (264) is slidingly connected to the vertical rods (26), such that it can slide along said rods (26) vertically upwards or downwards. Thereto, a first pair of sliding components (261) each slidingly connected to the rods (26) is attached to a upper back side of the sliding plate (264) and a second pair of sliding components (262) each slidingly connected to the rods (26) is attached to a lower back side of the sliding plate (264). For example, each sliding member (261, 262) may comprise a cylindrical passage along which the respective vertical rod (26) passes. The sliding plate (264) is also engaged to the worm gear (263) by means of a threaded connection. Thus, the rotation of the worm gear (263) by the gearmotor causes the sliding plate (264) to move up and down along the vertical rods (26).

Figure 3:
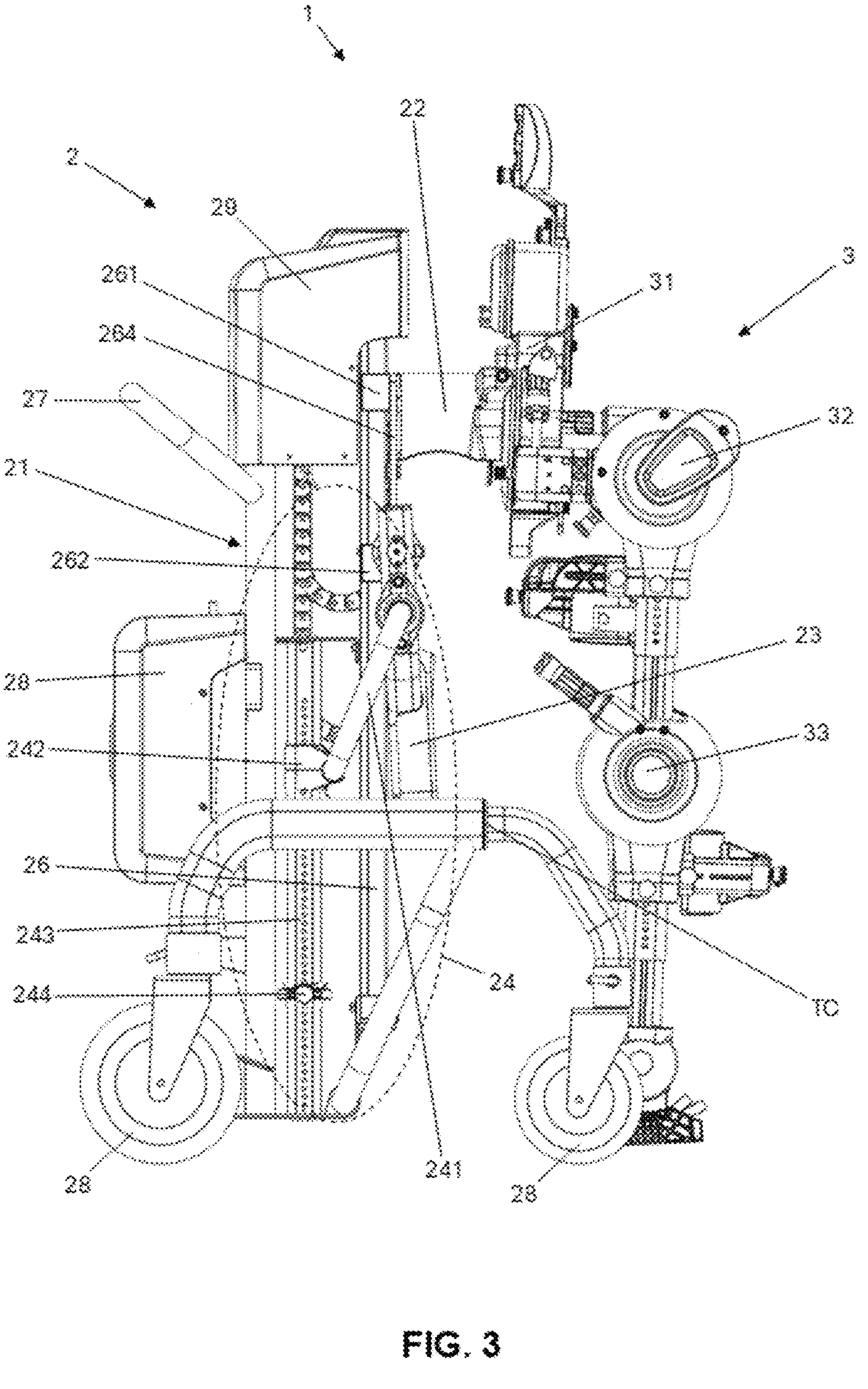
FIGS. 3-8 show a sequence of views of the exoskeleton system of the invention in during a sitting down process.
Figure 7:
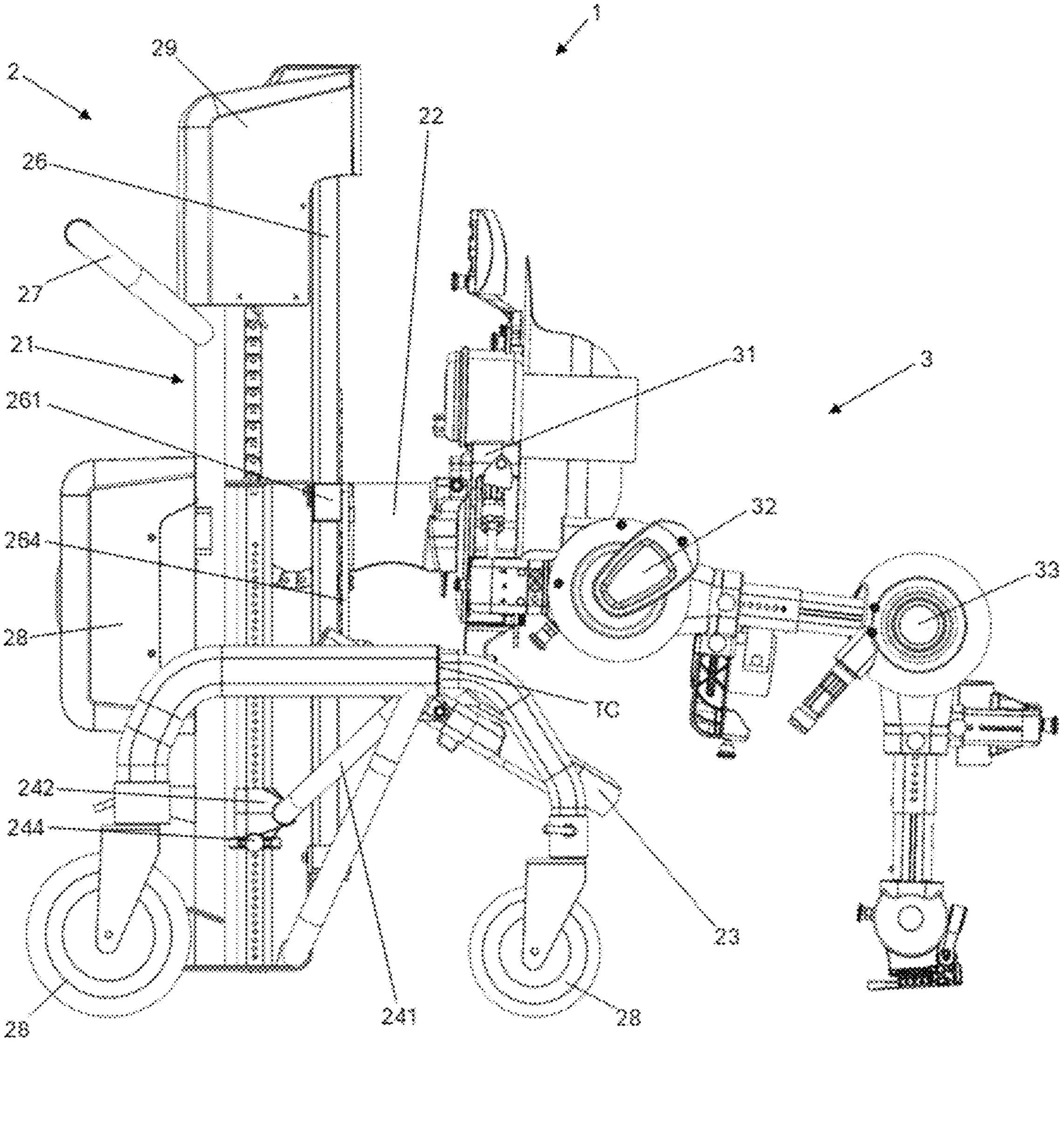
Figure 8:
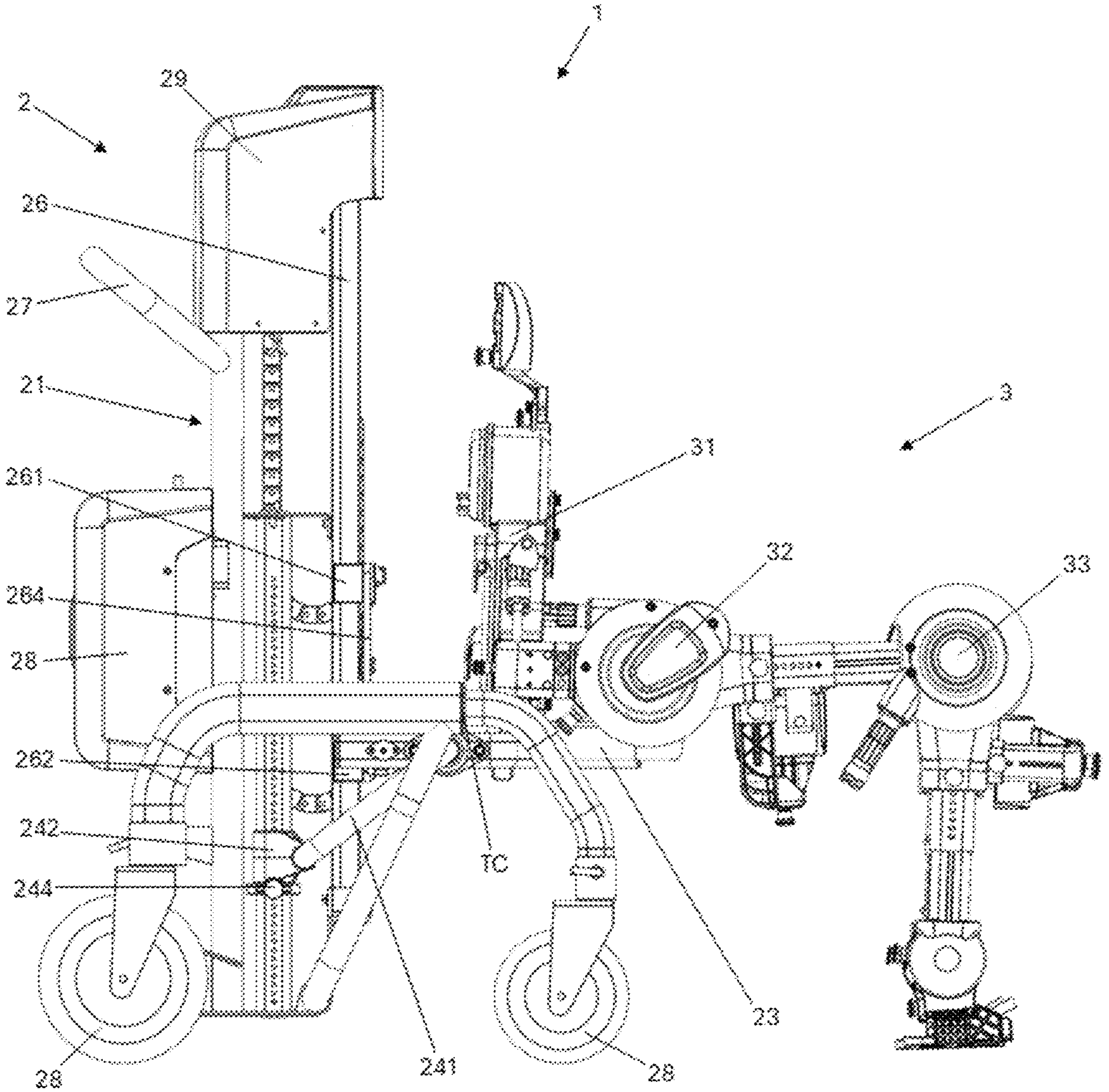

The displaceable connector (22) (shown only in FIGS. 3-8) is attached to an upper front side of the sliding plate (264). Thereby, upon the activation of the gearmotor, the displaceable connector (22) moves upwards or downwards. As shown in FIG. 3, an upper position of the sliding plate (264) along said vertical rods (26) causes the displaceable connector (22) to be at a height corresponding to a standing position of the user when wearing the exoskeleton (3). As shown in FIG. 8, a lower position of the sliding plate (264) along said vertical rods (26) causes the displaceable connector (22) to be at a height corresponding to a sitting position of the user when wearing the exoskeleton. The motorized movement of the sliding plate (264), and therefore of the displaceable connector (22), between the lower and upper positions aids the user in the process of standing up and sitting down.

The support device (2) further comprises the abovementioned foldable seat (23), which is connected to the wheeled frame (21). In particular, in the present example an upper side of the seat (23) is rotatably attached to a lower front side of the sliding plate (264). The seat (23) thereby moves up and down together with the displaceable connector (22), and it can be folded/unfolded by rotating around a horizontal axis oriented into the page in FIGS. 3-8.

The synchronization assembly (24) causes the seat (23) to automatically fold/unfold at a certain height between the upper and lower positions. Thereto, the synchronization assembly (24) comprises a vertical rail (243) attached to the vertical structure of the wheeled frame (21). The vertical rail (243) comprises a plurality of horizontal holes distributed longitudinally. The holes are configured for the rigid attachment of a stop member (244). Specifically, in this embodiment the stop member (244) comprises a body slidingly attached to the vertical rail (243) and a pin configured for insertion into any of the holes of said vertical rail (243). Thus, when the pin is inserted in a particular hole, the position of the stop member (244) along the vertical rail (243) is rigidly fixed.

The synchronization assembly (24) further comprises an arm (241) having an upper end rotatably attached to a position of the seat (23) separated from the upper side thereof and a lower end rotatably attached to a sliding member (242), where the sliding member (242) is slidably attached to the vertical rail (243). In this particular embodiment, there are two such arms (241), the upper ends thereof being rotatably connected to the seat (23) and the lower ends thereof being rotatably attached to the same sliding member (242), the two arms (241) thus having a fork-like appearance. The rotation axes of these two rotatable connections are also horizontal axes oriented into the page in FIGS. 3-8. Note that the connection between the upper ends of the arms (241) and the seat (23) is purposively separated from the upper side of the seat (23), which is the position where the axis of the rotatable connection between seat (23) and sliding plate (264) is provided. This relative position ensures that the upper end of the arms (241) exert a torque, i.e. an upward or downward force onto the seat (23), that causes the rotation of the seat (23) when at the desired position.

The support device (2) further comprises two locking devices (245, shown in FIG. 1*a*) configured for locking the rotatable attachment between the upper end of each of the two arms (241) and the seat (23) when the seat (23) is in the essentially horizontal unfolded position. In the present exemplary embodiment, the locking device (245) comprises a pin configured for insertion into a socket provided at said rotatable connection such that, upon insertion of the pin, the rotatable connection is blocked. When locked, the seat (23) remains in the unfolded position shown in FIG. 8 even if the sliding plate (264) is moved upwards and the sliding member (242) stops abutting against the stop member (244). This locking device (245) allows for moving the seat (23) up and down in the unfolded position irrespective of the position of the stop member (244).

The support device (2) also comprises a first sensor configured for detecting the position of the displaceable connector (22). In this exemplary embodiment, the first sensor is an encoder provided at the uppermost end of the worm gear (263), i.e. inside the casing (29). Thus, by detecting the precise rotational position of the worm gear (263), the vertical position of the displaceable connector is known. In addition, means for connection to the conventional plurality of sensors of the exoskeleton (3) detecting the position of the hip and knee joints are also provided. Again, for the sake of simplicity, these means are not shown in the figures.

Finally, the support device (2) comprises a second sensor provided at the rotatable attachment between the upper end of the arm (241) and the seat (23). This second sensor is configured for detecting a position where the seat (23) has arrived at the unfolded position. A number of different types of sensor could be employed for this purpose, preferably a switch.

As explained in detail below, these two sensors, along with the sensors monitoring the position of the hip and knee joints of the exoskeleton (3), provide the necessary information to command the gearmotor during the process of standing up or sitting down.

The operation of the exoskeleton system (1) for aiding a user in sitting down is now disclosed. At the beginning, the sliding plate (264) is at the upper position shown in FIG. 3. The displaceable connector (22) is therefore at a height that corresponds to the user standing up. The rear part of the lumbar portion (31) of the exoskeleton (3) worn by the user is attached to, i.e. hanging from, the displaceable connector (22). The seat (23) is also at the upper position, and thus the sliding member (242) slidingly attached to the vertical rail (243) is vertically separated from the stop member (244), which is rigidly attached to the vertical rail (243). In this condition, the weight of the seat (23) and the arms (241) pull from the seat (23) downwards, and therefore the seat (23) is rotated with respect to the sliding plate (264) around the joint provided at the upper side thereof such that it adopts a folded, essentially vertical position. The folded position is usually essentially vertical, although other folded positions can be defined e.g. having a slight inclination. The underlying concept is that space under the lumbar portion of the exoskeleton (3) is provided for the person to stand up naturally.

Now, the user desires to sit down. Depending on the size of the user, an assistant can move the stop member (242) to a desired height. Thereto, the assistant needs only to extract the pin from the corresponding hole of the vertical rail (243) and slide the stop member (242) upwards or downwards along said vertical rail (243). Once in the desired position, the assistant introduces the pin into the relevant hole, and the stop member (242) is thus rigidly attached to the rail (243).

Figure 4:
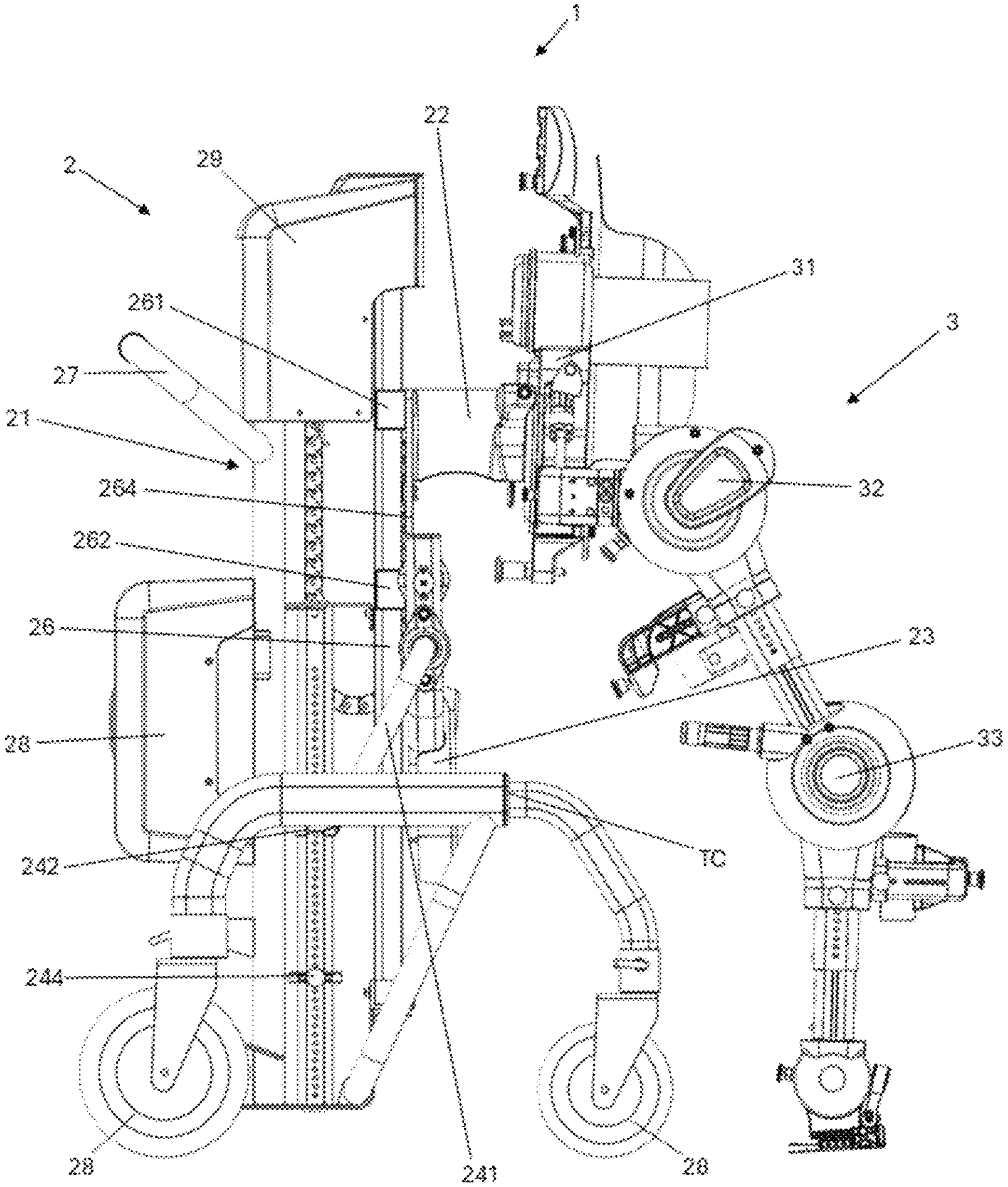
Figure 5:
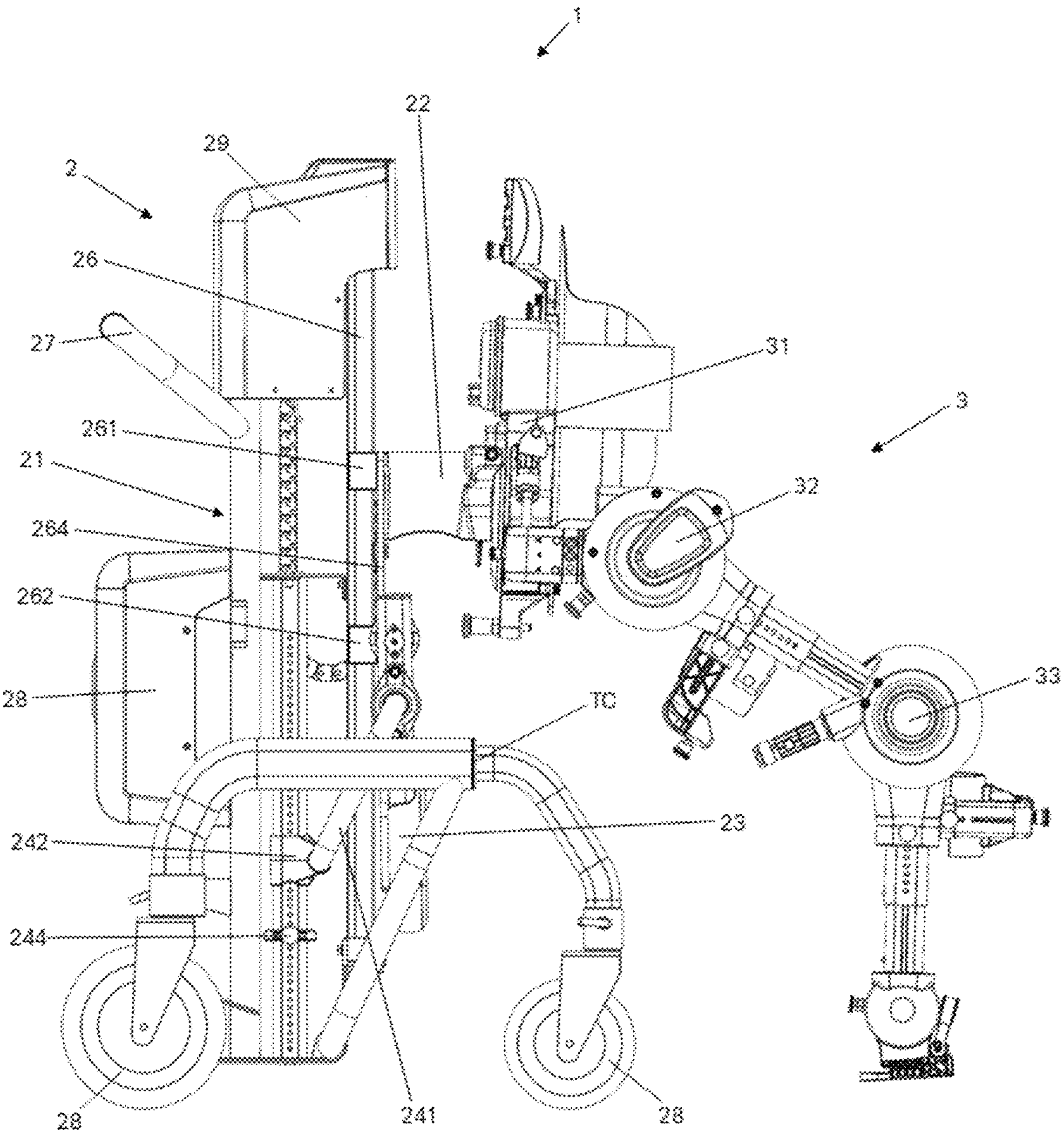
Figure 6:
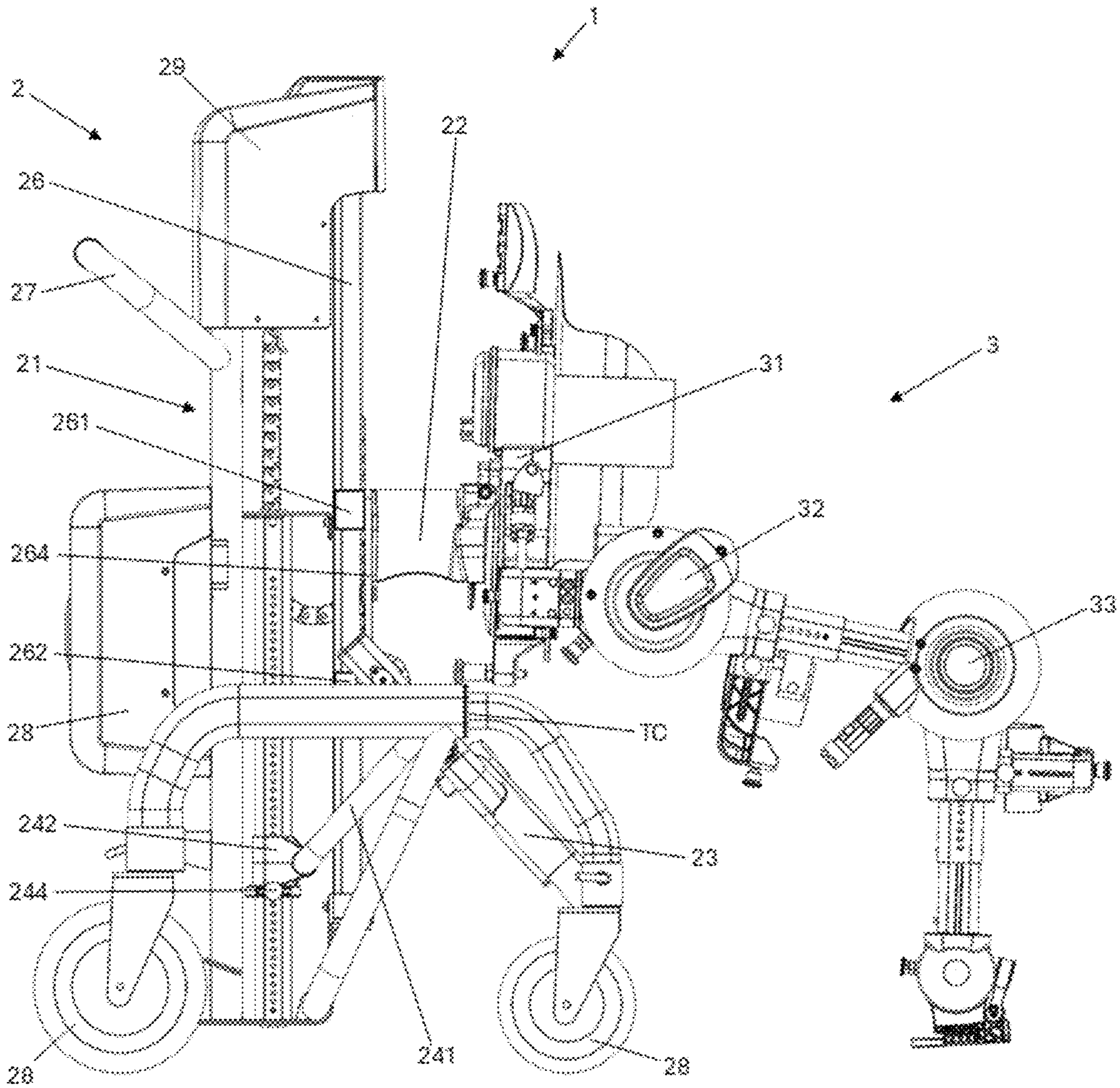

Then, the gearmotor is commanded to rotate the worm gear (263). When the worm gear (263) rotates, the sliding plate (264) is caused to slide downwards along the rods (26), as shown in FIG. 4. The knee (33) and hip (32) joints of the exoskeleton (3) start to bend to adopt a sitting position. The sliding member (242) attached to the lower end of the arms (241) also slides downwards along the rail (243). FIG. 5 shows a moment where the sliding member (242) is about to bump against the stop member (244). Once that happens, as shown in FIG. 6, the lower end of the arms (241), which is attached to said sliding member (242), can no longer move downwards. As a consequence, the arms (241) start to rotate and, at the same time, to "push" the seat (23) upwards. More accurately, the upper end of the seat (23), that is rotatably attached to the sliding plate (264), keeps moving downwards but the portion of the seat (23) connected to the upper end of the arms (241) cannot longer move freely downwards. The result is that the seat (23) starts to rotate upwards from the essentially vertical position towards an (eventually) essentially horizontal position. This process goes on, as shown in FIG. 7, until the seat (23) is in said unfolded position. The unfolded position shown in FIG. 8 is usually essentially horizontal, although other unfolded positions can be defined. The underlying concept is that the person using the exoskeleton can sit down naturally onto the seat (23).

In normal operation, the sitting position of the exoskeleton (3) is detected by the conventional plurality of sensors provided at the exoskeleton (3) for monitoring the position of the joints, particularly the hip joint (32) and the knee joint (33). This information is transmitted by means of suitable electrical connections to a processing means controlling the operation of the exoskeleton system (1). These processing means could be provided at any suitable position e.g. at either casing (28, 29) of the support device (2).

Simultaneously, the aforementioned processing means receive the information from the first sensor of the support device (2), i.e. the encoder installed at the upper end of the worm gear (263). As mentioned earlier, the information provided by this encoder is automatically translated into actual position of the displaceable connector (22).

Upon receiving this information, the processing means derive that the lower position has been arrived at. Consequently, the gearmotor is commanded to stop actuating the worm gear (263), and thus the sliding plate (264) stops moving downwards. The seat (23) remains in the essentially horizontal unfolded position for the user to comfortably doff the exoskeleton (3).

To increase security, the second sensor provided at the connection between the seat (23) and the upper end of the arms (241) detects that the seat (23) is at the essentially horizontal unfolded position. Should the above-disclosed information provided by the first sensor and the exoskeleton (3) sensors for any reason not trigger the command to stop the gearmotor, a signal provided by this second sensor does. Breakage of the mechanism is thus prevented should the gearmotor continue to move the sliding plate (264) downwards further after arriving at the lower position.

The operation of the exoskeleton system (1) for aiding the user in standing up is essentially the same although with the sliding plate (264) moving upwards instead of downwards. The process shown in FIGS. 3-8 takes place in the opposite direction as disclosed above. First, as shown in FIGS. 8-6, the sliding plate (264) moves upwards, thus causing the seat (23) to rotate downwards but still with the sliding member (242) abutting against the stop member (242). The force causing the rotation of the seat (23) is caused by gravity due to the weight of the seat (23) itself and also the weight of the arms (241). The seat (23) continues rotating downwards until arriving at the essentially vertical folded position and then, as shown in FIG. 5, the sliding member (242) separates from the stop member (244). The sliding plate (264) continues moving upwards until arriving at the upper position. Again, arrival at the upper position is detected by the sensors of the exoskeleton (3) providing the position of the hip and knee joints in combination with the information provided by the first sensor. The gearmotor is then commanded to stop. The user is now standing up and ready for walking around.

Finally, the support device (2) can be used as a wheelchair. Thereto, the assistant only has to actuate the locking devices (245) for blocking the seat (23) in the unfolded position. Then, with the displaceable connector (22) in the lower position, the user can be seated onto the seat (23). The assistant can then command the gearmotor to rotate the worm gear (263) for causing the sliding plate (264) to move upwards. Both the displaceable connector (22) and the seat (23) thus move upwards. However, the sliding plate (264) does not necessarily have to reach the upper position, but the movement can be commanded to stop as soon as the legs of the user cease to touch the ground (thus, the exoskeleton does not touch the ground either). Then, the assistant can push the handle (27) of the support device (2) to move it around in the manner of a wheelchair.

The invention claimed is:

1. A support device (2) for an exoskeleton system (1), the support device (2) comprising a wheeled frame (21), a displaceable connector (22) configured to connect to a lumbar portion (31) of an exoskeleton (3), and a powered mechanism connected to the wheeled frame (21) and the displaceable connector (22) for causing said displaceable connector (22) to move up and down with respect to the wheeled frame (21) between an upper position and a lower position, the support device (2) further comprising a foldable seat (23) connected to the wheeled frame (21), and a synchronization assembly (24) configured to fold/unfold said foldable seat (23) in synchronization with the movement of said displaceable connector (22), wherein the foldable seat (23) is configured to move up and down together with the displaceable connector (22), and wherein the synchronization assembly (24) is configured to select a desired height at which a synchronized process of folding/unfolding of the seat (23) takes place.

2. The support device (2) according to claim 1, wherein the powered mechanism comprises a sliding plate (264) slidingly connected to at least one vertical rod (26), and a gearmotor configured to move the sliding plate (264) up and down along said vertical rod (26), wherein the displaceable connector (22) is attached to an upper portion of the sliding plate (264) and the seat (23) has an upper side rotatably connected to a lower portion of the sliding plate (264), and wherein the synchronization assembly (24) is configured to cause the rotation of the seat (23) with respect to the sliding plate (264) from an vertical folded position to an horizontal unfolded position upon said sliding plate (264) reaching a desired height when moving downwards, and to cause the rotation of the seat (23) with respect to the sliding plate (264) from the horizontal unfolded position to the vertical folded position upon the sliding plate (264) reaching the desired height when moving upwards.

3. The support device (2) according to claim 2, wherein the powered mechanism further comprises a worm gear (263) provided in parallel to said at least one vertical rod (26), the sliding plate (264) being threadedly engaged to said worm gear (263), such that when a gearmotor rotates the worm gear (263), the sliding plate (264) is caused to slide vertically along the at least one vertical rod (26).

4. The support device (2) according to claim 2, wherein the sliding plate (264) is slidingly connected to the at least one vertical rod (26) by means of at least one first sliding component (261) and at least one second sliding component (262) respectively provided at an upper back side of the sliding plate (264) and at a lower back side of the sliding plate (264).

5. The support device (2) according to claim 2, wherein the synchronization assembly (24) comprises:

a vertical rail (243);

an arm (241) having an upper end rotatably attached to a position of the foldable seat (23) separated from an upper side thereof and a lower end rotatably attached to a sliding member (242), wherein the sliding member (242) is slidably attached to the vertical rail (243); and a stop member (244) configured to be rigidly attached to the vertical rail (243) at a selected height along said vertical rail (243), such that, as the displaceable connector (22) moves downwards from the upper position, the sliding member (242) also slides downwards along the vertical rail (243) and, upon abutting against the stop member (244) rigidly attached to said vertical rail (243), the arm (241) exerts an upward force onto the seat (23) that causes an upward rotation until arriving to the horizontal unfolded position, and conversely as the displaceable connector (22) moves upwards from the lower position, eventually the sliding member (242) slides upwards along the vertical rail (243) and ceases to abut against the stop member (244), the arm (241) then ceasing to exert an upward force onto the seat (23) and allowing gravity to cause the seat (23) to rotate downwards until arriving to the vertical folded position.

6. The support device (2) according to claim 5, wherein the rail (243) comprises a plurality of holes and the stop member (244) comprises a pin configured to selectively engage a selected hole at the selected height.

7. The support device (2) according to claim 5, further comprising a locking device (245) configured for locking the rotatable attachment between the upper end of the arm (241) and the seat (23) when the seat (23) is in the horizontal unfolded position such that, when locked, the seat (23) remains in said unfolded position when the sliding member (242) stops abutting against the stop member (244).

8. The support device (2) according to claim 1, wherein the synchronization assembly (24) is configured for selecting a desired height manually.

9. The support device (2) according to claim 1, further comprising:

a first sensor detecting the position of the displaceable connector (22), and means configured for connection with a plurality of sensors of the exoskeleton (3) detecting the position of the hip and knee joints of said exoskeleton (3), whereby the powered mechanism is automatically controlled depending on the position of the displaceable connector (22) and of the hip and knee joints of the exoskeleton (3).

10. The support device (2) according to claim 9, wherein the first sensor detecting the position of the displaceable connector (22) is an encoder provided at an uppermost end of the worm gear (263).

11. The support device (2) according to claim 1, further comprising a second sensor provided at the rotatable attachment between the upper end of the arm (241) and the seat (23) for detecting a position where the seat (23) has arrived at the unfolded position, whereby the powered mechanism is automatically stopped when said unfolded position is detected.

12. An exoskeleton system (1) comprising a support device (2) according to claim 1 and an exoskeleton (3) comprising a lumbar portion (31) having means for connection to the displaceable connector (22).

13. A method for operating an exoskeleton system (1) comprising a support device (2), the support device comprising a wheeled frame (21), a displaceable connector (22) configured to connect to a lumbar portion (31) of an exoskeleton (3), a powered mechanism configured to move the displaceable connector (22) up and down with respect to the wheeled frame (21) between an upper position and a lower position, a foldable seat (23), and a synchronization assembly (24) configured to fold/unfold the foldable seat (23) in synchronization with movement of the displaceable connector (22), the method comprising:

during a stand-up process, commanding the powered mechanism to move the displaceable connector (22) upwards and, upon reaching the upper position where the hip and knee joints of the exoskeleton (3) are detected to be extended, commanding the powered mechanism to stop; and during a sitting process, commanding the powered mechanism to move the displaceable connector (22) downwards and, upon reaching the lower position where the hip and knee joints of the exoskeleton (3) are detected to be bent, commanding the powered mechanism to stop.

14. The method according to claim 13, further comprising the step of commanding the powered mechanism to stop when a sensor detects that the seat (23) has arrived at the folded position irrespective of the condition of the hip and knee joints of the exoskeleton (3).

15. The method according to claim 13, further comprising the step of:

actuating the locking device (245) to lock the seat (23) in the unfolded position;

commanding the powered mechanism to move a sliding plate (264) upwards to an intermediate position between the lower position and the upper position, thereby causing the seat (23) to move upwards; and moving the support device (2).

* * * * *